No. 826,668. PATENTED JULY 24, 1906.
E. C. KETCHUM.
DYNAMO.
APPLICATION FILED JULY 3, 1905.

4 SHEETS—SHEET 2.

Witnesses:
Nathan C. Lombard.
Edwin T. Luce

Inventor:
Ernest C. Ketchum,
by Walter E. Lombard,
Atty.

No. 826,668. PATENTED JULY 24, 1906.
E. C. KETCHUM.
DYNAMO.
APPLICATION FILED JULY 3, 1905.

4 SHEETS—SHEET 3.

Witnesses:
Nathan C. Lombard
Edwin T. Luce

Inventor:
Ernest C. Ketchum,
by Walter E. Lombard,
Atty.

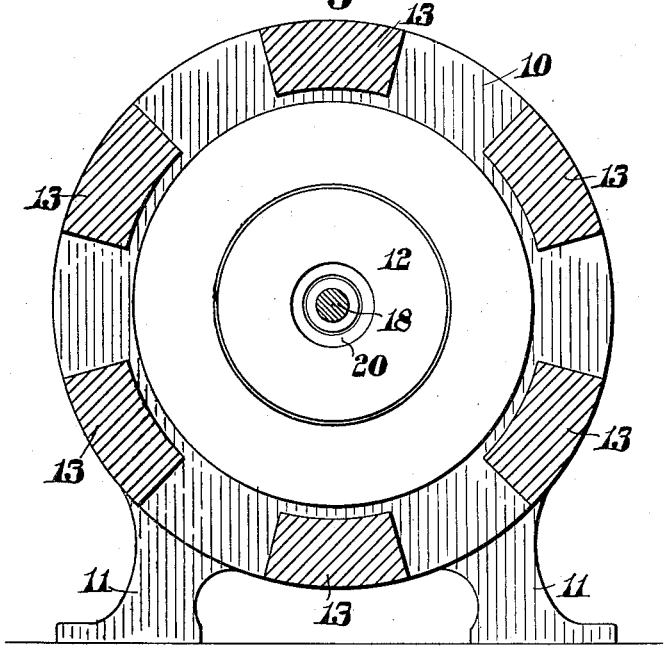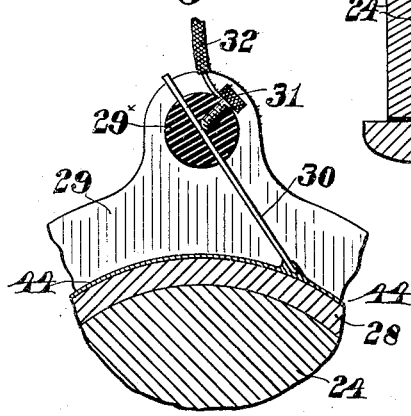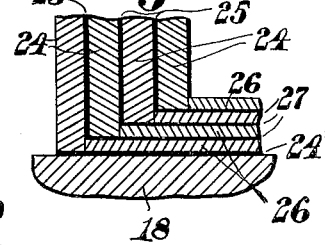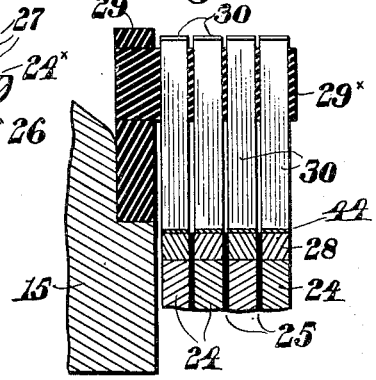

UNITED STATES PATENT OFFICE.

ERNEST C. KETCHUM, OF BOSTON, MASSACHUSETTS.

DYNAMO.

No. 826,668.

Specification of Letters Patent.

Patented July 24, 1906.

Application filed July 3, 1905. Serial No. 268,059.

*To all whom it may concern:*

Be it known that I, ERNEST C. KETCHUM, a citizen of the United States of America, and a resident of Boston, in the county of Suffolk and State of Massachusetts, have invented certain new and useful Improvements in Dynamos, of which the following is a specification.

This invention relates to dynamo-electrical machines, and has for one of its objects the production of such a machine in which the armature may be driven direct at a great velocity from high-speed motors, such as turbine-engines, without endangering the displacement of any of the elements of said armature.

A further object of the invention is to produce a machine in which the lines of force in the field may be constantly cut by the armature without effecting therein any reversal of current or change in polarity, thereby reducing to a minimum eddy-currents and armature losses.

The invention consists in providing the field with a plurality of poles in alinement between which an armature may be revolved, the said armature being composed of a plurality of disks connected in pairs by tubular members and in series by external means, such as brushes coöperating with the periphery thereof and connected in circuit by suitable wires.

The invention further consists in certain novel features of construction and arrangement of parts, which will be readily understood by reference to the description of the drawings and to the claims to be hereinafter given.

Figure 1:
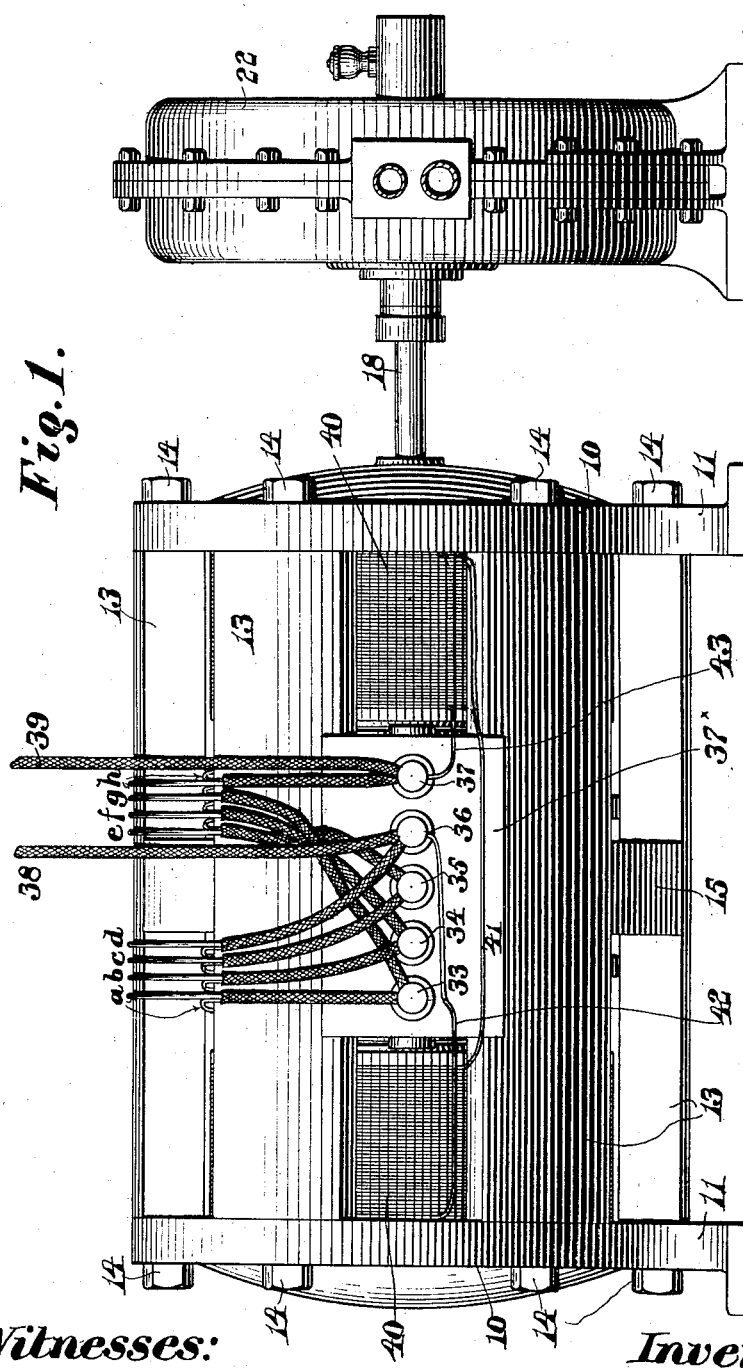
Figure 2:
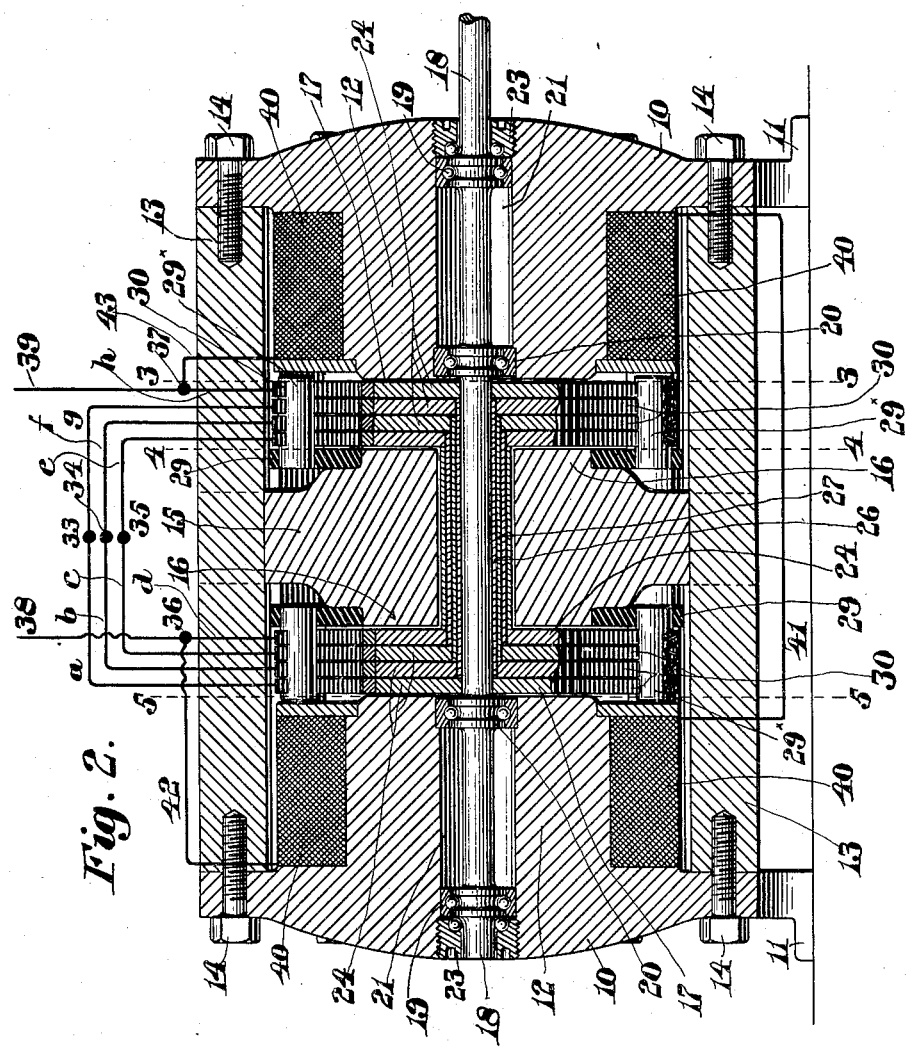
Figure 3:
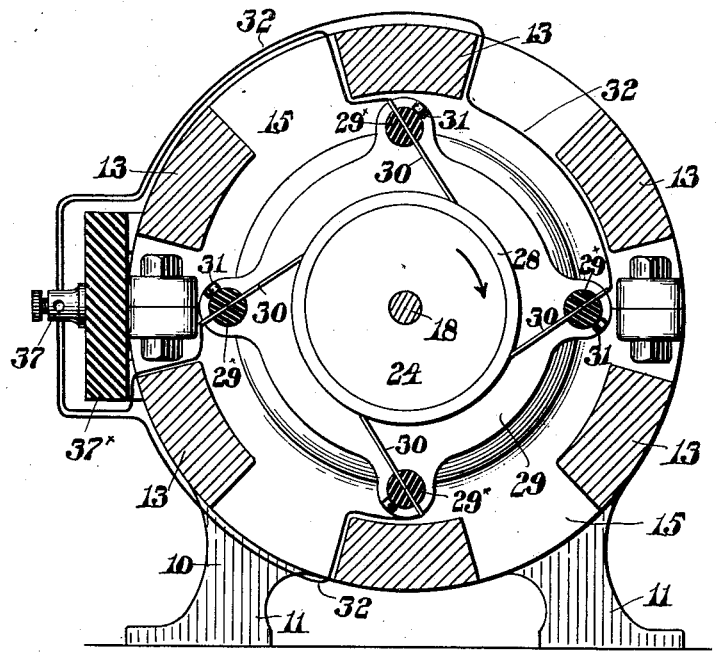
Figure 4:
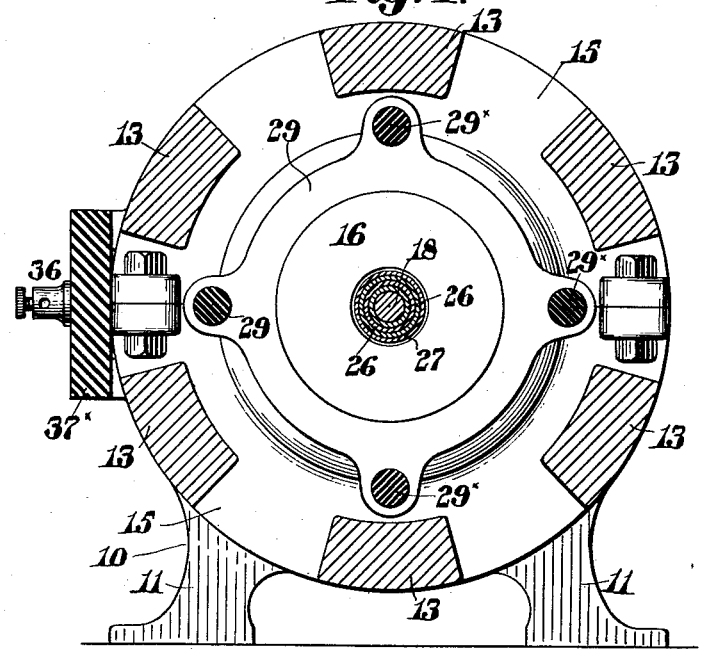

Of the drawings, Figure 1 represents an elevation of a machine embodying the features of this invention, together with its motor. Fig. 2 represents a longitudinal vertical section of said machine. Figs. 3, 4, and 5 represent, respectively, transverse vertical sections on lines 3 3, 4 4, and 5 5 on Fig. 2; and Figs. 6, 7, and 8 represent enlarged details to be hereinafter referred to.

Similar characters designate like parts throughout the several figures of the drawings.

In the drawings, 10 represents end pieces supported by suitable legs 11 and provided with inwardly-extending cylindrical hubs 12, which form cores or poles for the field. Interposed between and connecting said end pieces 10 are a plurality of members 13, united thereto by means of the bolts 14. Located centrally of said members 13 is the member 15, either face of which is provided with a pole 16 in alinement with each other and with the poles 12 of the end pieces 10. Interposed between the poles 12 and 16 and separated therefrom by suitable air-spaces is an armature 17, said armature being driven by a shaft 18 revoluble in antifriction-bearings 19 and 20, located within the chamber 21 in the end pieces 10. The bearing 20 is placed at the extreme inner face of the pole 12 to insure support for said armature 17 near either end thereof. The shaft 18 is driven direct by means of a turbine-engine 22 or other high-speed motor. Screwed into the outer ends of the chamber 21 and surrounding the shaft 18 are thrust-bearings 23, which prevent any end movement of said shaft. The armature 17 is composed of a plurality of disks 24 of high magnetic permeability separated from each other by insulating-plates 25. The outer pair of disks 24 are mounted directly upon an insulating-tube 24*, secured directly to the revoluble shaft 18, and this pair of disks is connected by a tubular member 26, extending from the inner face of one to the inner face of the other. The tubular member 26 is surrounded by a tube of insulating material 27, upon which is mounted the next pair of disks 24, which pair is in turn connected by means of a second tubular member surrounding the insulating-tube 27. All the pairs of disks are mounted in like manner upon the insulating-tube surrounding a metallic tube-connector 26, and each pair is connected by a metallic tube-connector 26, interposed between the inner faces thereof, as better shown in Fig. 6 of the drawings. As will be seen by reference to this figure, all of the disks 24 are insulated from each other by the member 25 and are insulated from the shaft on which they are mounted by the members 27, which members 27 also insulate the tubes 26 around the revoluble shaft 18 from each other, each tube 26 serving as a conductor between its own pair of disks 24. It is obvious that the number of disks 24 and tubes 26 may be increased indefinitely. The disks 24 are of steel and are provided with an annular peripheral band 28, of copper, which serves to conduct the current of electricity quickly to and from all portions of the periphery of said disk, from which it moves in radial lines to and from the center, where it flows through a tube 26.

The member 15 is provided on either face with an insulating-plate 29, each plate being provided with studs 29*, of insulating material, each of which is provided with a plurality of metallic brushes 30, each of which coöperates with a copper ring 28 of one of the armature-disks 24. These brushes 30 are insulated from each other and connected by binding-screws 31 to wires 32, which connect all of the brushes for a single disk with its own terminal. There are five of these terminals 33, 34, 35, 36, and 37, mounted in a plate 37* of suitable insulating material. With the terminal 33 the wire a, leading from the left-hand disk 24, connects, and with this terminal also connects the wire g, leading from the second disk from the right of Fig. 2. With the terminal 34 the wires b and f connect, and in like manner the wires c and e connect with the terminal 35. The wire d of the inner disk 24 of the left-hand group connects with the terminal 36. The wire h of the outer right-hand disk 24 connects with the terminal 37. It will thus be seen that by means of the wiring connecting with the terminals thus described and the connecting-tubes 26 the disks 24 are connected in series so that a current may pass successively from one of the outer disks through the wire connections to the next inner disk of the opposite group, then through the tube connecting it with its mate in the first group, again through wire connections to the next inner disk of the opposite group, and so on until the inner disk of the first-mentioned group is reached, which communicates with the terminal 36, while the outer disk of the opposite group connects with the terminal 37. A main conducting-wire 38 also connects with the terminal 36 and forms with the main wire 39, leading to the terminal 37, a suitable circuit. Each of the poles 12 is surrounded by the coils 40, connected together by the wire 41, while the opposite ends of each coil are connected, respectively, by wires 42 43 with the terminals 36 and 37. As the shaft 18 is revolved by means of the turbine 22 an electric current will be generated thereby in the field-coil which will build up the field and cause the lines of force to be materially increased as they move inwardly from the positive poles 12 to the negative poles 16, a complete circuit of these lines of force being made through the intermediate member 15 and the yokes 13 back to said poles 12.

It will be seen that as the poles are all in alinement and the armature is in alinement therewith the working parts of the armature when in operation always move in a plane at right angles to the lines of force and are constantly cutting the same without producing a reversal of the current and a change of polarity in the armature. By this arrangement whereby the movement of the armature is always at right angles to the lines of force in the field the eddy-currents and other losses which are frequent in other types of dynamos are entirely eliminated in a machine of this construction.

By providing an armature in which wires are entirely dispensed with the armature is permitted to revolve at a high velocity without endangering the displacement of any of the elements which form the same. It is intended that the shaft 18 should be in perfect alinement and that the periphery of the disks forming the armature thereon should be concentric with the axis thereof. It is evident, however, that for some reasons the shaft might get displaced and out of alinement or the periphery of the disks be worn at certain parts, so that a perfect contact with the brushes would not be secured when said disks are revolving at the high velocity essential for the proper working of a machine of this construction. In order to obviate this disadvantage should it occur and to further prevent the wear of the parts as the disks revolve at high speed in contact with the brushes 30, the periphery of each of the disks is provided with a coating or thin film 44 of amalgam of mercury or similar material. This amalgam acts as a lubricant and prevents undue wear of either the brush or the annular copper ring 28 on the disk 24. As the disk revolves rapidly the brush will collect a portion of the amalgam around its end, as shown in Fig. 7, and even when passing over inequalities in the surface of said ring a perfect connection is assured at all times. This forms quite an important feature of the invention, as a perfect operation of the machine at a great velocity is secured by this means, and the constant slapping and breaking of the circuit which would be the case when passing over inequalities in the surface of the ring 28 is obviated. As the brush passes over the amalgam it causes it to fill in any depressions in the surface of the periphery, thereby insuring a perfectly concentric surface.

As the polarity of the armature is constant and unchanging and the flow of flux thereto from the positive poles 12 is equal, producing on either end of said armature an equal stress, a perfectly-balanced armature is the result, which is of the greatest advantage in a machine of this type, where in order to secure effective results it is essential that the armature be revolved at a greater velocity than has heretofore been believed possible. By connecting a third main to the terminal 35 a three-wire system may be operated with a single machine of this construction, which is of considerable advantage, for heretofore it has been necessary to use two dynamos when it has been desired to operate a three-wire system. The formation of a chamber in the cores 12 in which bearings 19 20 are located for the shaft 18 is another advantage, as it provides a means of securing a bearing for said shaft at a point immediately adjacent the ends of said armature 17. Where the shaft 18 sustains the greatest strain between the disks 24, it is reinforced and strengthened by the plurality of tubular members 26, superimposed thereon.

In order to secure the proper working of the armature, it is quite essential that the disks forming the same should have high tensile strength owing to the great velocity with which they are driven. At the same time it is desirable that these disks be of the highest magnetic permeability, and in order to secure both of these desired results it is necessary that the disks should be formed of steel in which the carbon used will be reduced to a minimum in order to secure the desired magnetic permeability and that the carbon omitted from said steel be replaced with from three to five per cent. of nickel to secure the high tensile strength and elastic limit desired. This forms a very important part of the invention, as disks formed of ordinary steel or iron either are deficient in the desired magnetic permeability or the tensile strength which is absolutely essential to the disks driven at such high velocities as is necessary to secure the proper working of a machine of this class. The copper band 28, which is secured to the periphery of the disks, must be brazed thereto throughout the periphery, for any other means of securing the same to the disks would be unreliable, these disks revolving at such a rate of speed as to be liable to dismember the bands and disconnect them from the disks.

The dynamo shown in the drawings is particularly designed for use in connection with a single-stage impulse steam-turbine, and the armature of the dynamo is mounted directly upon the main driving-shaft without the use of gears or other intermediate devices.

By this construction of machine a most powerful generator of electricity is produced which is capable of being driven direct by turbine-engines and other high-speed motors and which will produce a greater voltage than could be secured from machines of other types of greatly-increased size, thus being more economical for the user.

It is believed that from the foregoing the operation of the machine will be readily understood without further description.

Having thus described my invention, I claim—

1. In the rotatable member of a dynamo-electrical machine, the combination of a shaft, two sets of metal disks thereon, insulations between said disks, tubular members connecting the disks of two sets in pairs, and other means for electrically connecting said disks of the two sets in series.

2. In the rotatable member of a dynamo-electrical machine, the combination of a shaft, two sets of metal disks thereon, insulations between said disks, a tubular member connecting the outer disks of each set, a second tubular member surrounding the first and connecting the next pair of disks, a third tubular member surrounding the second and connecting the next pair of disks, insulations between said tubular members, and external means for electrically connecting said disks of the two sets in series.

3. In the rotatable member of a dynamo-electrical machine, the combination of a shaft, two sets of metal disks of high magnetic permeability, insulations between the disks, members connecting said disks in pairs, a copper peripheral band secured to each of said disks, a brush coöperating therewith, and means for connecting said brushes to unite the disks in series.

4. In the rotatable member of a dynamo-electrical machine, the combination of a shaft, two sets of metal disks of high magnetic permeability, insulations between the disks, members connecting said disks in pairs, a copper peripheral band secured to each of said disks, a film of mercury upon said band, a brush coöperating therewith, and means for connecting said brushes to unite the disks in series.

5. In the rotatable member of a dynamo-electrical machine, the combination of a shaft, two sets of metal disks of high magnetic permeability, insulations between the disks, members connecting said disks in pairs, antifriction material upon the periphery of said disks, a brush coöperating therewith, and means for connecting said brushes to unite the disks in series.

6. In a dynamo-electrical machine, the combination of a field-magnet, a shaft mounted in bearings in the poles thereof, a plurality of separated metal disks mounted therein parallel with the faces of said poles, tubular members connecting the disks in pairs, and electric connections uniting said disks in series.

7. In the rotatable member of a dynamo-electrical machine, the combination of a shaft, two sets of metal disks of high magnetic permeability, insulations between the disks, members connecting said disks in pairs, a film of mercury upon the periphery of said disks, a brush coöperating therewith, and means for connecting said brushes to unite the disks in series.

8. In the rotatable member of a dynamo-electrical machine, the combination of a shaft, two sets of metal disks of high magnetic permeability, insulations between the disks, members connecting said disks in pairs, a peripheral band of high conductivity secured to each of said disks surrounding said shaft, a brush coöperating therewith, and means for connecting said brushes to unite the disks in series.

9. In the rotatable member of a dynamo-electrical machine, the combination of a shaft, two sets of metal disks of high magnetic permeability, insulations between the disks, members connecting said disks in pairs, each member being shorter than that upon which it is mounted, a peripheral band of high conductivity secured to each of said disks surrounding said shaft, a brush coöperating therewith, and means for connecting said brushes to unite the disks in series.

10. In the rotatable member of a dynamo-electrical machine, the combination of a shaft, two sets of metal disks of high magnetic permeability, insulations between the disks, members connecting said disks in pairs, a peripheral band of high conductivity secured to each of said disks surrounding said shaft, and a brush coöperating therewith.

11. In a dynamo-electrical machine, the combination of a field-magnet provided with two poles in alinement, an intermediate pole alined therewith, insulating-disks secured to each face thereof, armature-disks revoluble between said poles, and brushes secured to said insulating-disk and coöperating with said disks.

Signed by me at Boston, Massachusetts, this 30th day of June, 1905.

ERNEST C. KETCHUM.

Witnesses:
WALTER E. LOMBARD,
EDNA C. CLEVELAND.